(12) United States Patent
Käppeli et al.

(10) Patent No.: US 6,820,386 B2
(45) Date of Patent: Nov. 23, 2004

(54) HARD TILE WITH LOCKING PROJECTIONS AND CUTOUTS

(75) Inventors: Simon Käppeli, Claro (CH); Aris Ghilardi, Brione/Sopra (CH)

(73) Assignee: Forbo-Giubiasco SA, Giubiasco (CH)

( * ) Notice: Subject to any disclaimer, the term of this patent is extended or adjusted under 35 U.S.C. 154(b) by 0 days.

(21) Appl. No.: 10/322,495

(22) Filed: Dec. 19, 2002

(65) Prior Publication Data
US 2003/0131549 A1 Jul. 17, 2003

(30) Foreign Application Priority Data
Dec. 24, 2001 (EP) .............................................. 01130815

(51) Int. Cl.⁷ .................................................. E04B 2/46
(52) U.S. Cl. ..................................................... 52/591.4
(58) Field of Search ............................ 52/591.4, 592.1, 52/592.2, 590.2, 59.11, 390, 392

(56) References Cited

U.S. PATENT DOCUMENTS

| | | | |
|---|---|---|---|
| 2,189,218 A | | 2/1940 | Neumeister |
| 2,325,414 A | * | 7/1943 | McChesney et al. ......... 361/220 |
| 3,828,503 A | * | 8/1974 | Hofmann ...................... 52/393 |
| 4,018,025 A | * | 4/1977 | Collette ...................... 52/302.4 |
| 4,699,677 A | * | 10/1987 | Rooklyn ........................ 156/71 |
| 4,807,412 A | * | 2/1989 | Frederiksen ................... 52/177 |
| 5,791,114 A | * | 8/1998 | Mandel ....................... 52/591.3 |
| 5,907,934 A | * | 6/1999 | Austin .......................... 52/177 |
| 6,343,451 B1 | * | 2/2002 | Chih et al. ..................... 52/390 |
| 2002/0178661 A1 | * | 12/2002 | Burke et al. ................... 52/177 |
| 2002/0189176 A1 | * | 12/2002 | Stegner et al. ................. 52/177 |
| 2003/0093964 A1 | * | 5/2003 | Bushey et al. .............. 52/592.1 |

FOREIGN PATENT DOCUMENTS

| | | |
|---|---|---|
| DE | 31 16 507 A | 11/1982 |
| EP | 1 128 713 A | 8/2001 |
| FR | 2 675 078 A | 10/1992 |
| GB | 303 324 A | 1/1929 |
| WO | WO 00 17467 A | 3/2000 |

* cited by examiner

Primary Examiner—Leslie A. Braun
Assistant Examiner—Kofi Schulterbrandt
(74) Attorney, Agent, or Firm—Oliff & Berridge, PLC

(57) ABSTRACT

A tile having a support layer and a wearing layer. The wearing layer and the support layer are polygonal. The edge regions of the support layer have projections and cutouts, the projections being intended to engage in a positively locking manner in the cutouts in the support layer of adjacent tiles. The tiles may also have an intermediate layer which is electrically conductive. After the tiles have been laid, neither cutouts nor projections are visible from above, since the tiles are mechanically secured by the support layer.

13 Claims, 10 Drawing Sheets

HARD TILE WITH LOCKING PROJECTIONS AND CUTOUTS

BACKGROUND OF THE INVENTION

1. Field of Invention

The invention relates to a hard tile having a support layer and a wearing layer and to a covering surface comprising such tiles. Nowadays, very high demands in terms of mechanical strength, resistance to wear and resistance to chemicals are imposed on covering surfaces made from plastics. Moreover, such coverings should not undergo any electrostatic charging or should at most undergo extremely slight electrostatic charging.

2. Description of Related Art

European Patent EP-A 1 128 713 discloses tiles made from highly compressed thermoplastic with a nonconductive support layer and a conductive wearing layer. A wearing surface of the wearing layer is provided with a securely adhering conductive substance. The tiles described in that document have connecting elements in tongue-and-groove form. Only specialist workers can lay tiles of this type. The tongue-and-groove connection often tears, and in addition the tiles are complicated and expensive to produce.

Tiles for floor coverings are generally secured to one another by means of plug connections. The joints which are present between the individual tiles are susceptible to dust and dirt. This can lead to the projections curving upward over the course of time. This makes the floor covering more difficult to drive on and reduces its service life, which is undesirable for economic and ecological reasons.

Therefore, it is an object of the present invention to provide a hard tile which is configured in such a way that it is easy to lay.

A further object of the present invention is to provide a covering surface which is produced using tiles which are easy to lay and which has a long service life.

SUMMARY OF THE INVENTION

The wearing layer of the tile according to the invention is polygonal in shape and is preferably square or hexagonal. The wearing layer does not have either cutouts or projections. After the tiles according to the invention have been laid, neither cutouts nor projections are visible from above, since the tiles are mechanically secured by the support layer. The floor covering has narrow joints between the individual tiles. The regular, preferably square pattern of these joints also allows simple welding, so that it is impossible for any dirt to adversely affect the floor covering. The wearing layer is preferably electrically conductive.

The support layer of the tile according to the invention is of substantially the same size as the wearing layer and is preferably likewise polygonal. In its edge regions, the support layer has projections and mating cutouts. The edge region of the support layer has a width which corresponds to the length of the cutouts and projections. The projections are intended to engage in a positively locking manner in the cutouts in adjacent tiles.

In one embodiment, the intermediate layer extends over at least two adjacent edge regions of the support layer and at least two further edge regions of the support layer are free of the intermediate layer. When the tiles according to the invention are being laid, this leads to those projections on the edge regions of the support layer over which the intermediate layer extends engaging in those cutouts in the edge regions of the support layer which are free of the intermediate layer. As a result, a covering which is produced using the tiles according to the invention has a continuous intermediate layer, ensuring electrical conductivity over the entire area. Since the location of the mechanical connection is not at precisely the same point as the electrical connection, this means that slight local shifts in adjacent tiles do not lead to an interruption in the conductivity, and therefore there is a high degree of reliability with regard to the electrical conductivity.

In a further embodiment, the intermediate layer extends over at least two adjacent edge regions of the support layer and over the projections of the support layer of two further adjacent edge regions. The result of this is that the intermediate layer is doubled up in those regions in which the tiles are secured to one another. Therefore, a floor covering produced in this way satisfies the high demands imposed with regard to the electrical conductivity.

The tiles according to the invention can even be laid on uneven subfloors without the dissipation of the electrostatic charges being adversely affected. The tiles according to the invention are laid without a fixed joint to the subfloor.

Production of the tiles according to the invention is very advantageous, since only the wearing layer has to satisfy the particular demands with regard to the electrical conductivity, the resistance to wear and the resistance to aggressive chemicals. The intermediate layer has to be electrically conductive.

Depending on requirements, inexpensive materials, such as for example reclaimed materials, can be used for the support layer.

The wearing layer of the tile according to the invention is preferably made from thermoplastic particles, generally chips, which are provided with a conductive coating before being pressed. During the pressing at elevated temperature, the plastic particles are subjected to considerable deformation together with the conductive coating, resulting in a homogeneous block which has uniformly distributed, thin conductive layers passing through it. In a particularly preferred embodiment, the wearing layer has a grid printed on its underside, increasing the conductivity between wearing layer and intermediate layer (cf. also EP 0 869 217).

It is particularly advantageous for the projections to have a dovetail-like shape, since this makes the laying of the tiles to form a covering surface and also dismantling of such a covering surface particularly simple without the electrical conductivity between the tiles being adversely affected. The dovetail-like cutouts may be either polygonal or undercut. In one embodiment, narrow and wide projections and undercuts alternate at regular intervals. The shape and width of the dovetails can be matched to the demands of the particular application; in particular, appropriate attention must be paid to the radii.

The electrical charging is preferably dissipated via the edges of the covering surface produced using the tiles according to the invention.

The intermediate layer of the tiles according to the invention is an electrically conductive sheet-like structure. This may, for example, be a metal grid, a pattern of conductive fabric or copper strips, but may also be a conductive film or a conductive coating layer. Polystyrene films with added carbon black and soft polyvinyl chloride films with added carbon black are particularly preferred.

In a further embodiment, the load-bearing capacity of the support layer is increased if the support layer has compression elasticity properties. By way of example, the support layer may be at least half made up of a polygonal structure, such as a honeycomb structure. The recesses in the edge regions of the polygonal structures improve the ventilation of the subfloor, which is preferable in particular in moist environments. The tile according to the invention is preferably produced in such a way that the intermediate layer is applied to the wearing layer which has been laid down. This can be effected either by applying the film or by applying a coating. In a final step, the support layer is applied, preferably by means of injection molding, to the intermediate layer which has been applied to the wearing layer.

BRIEF DESCRIPTION OF THE DRAWINGS

The subject matter of the invention is explained below by way of example with reference to FIGS. 1–9, wherein.

DETAILED DESCRIPTION OF PREFERRED EMBODIMENTS

Figure 1:
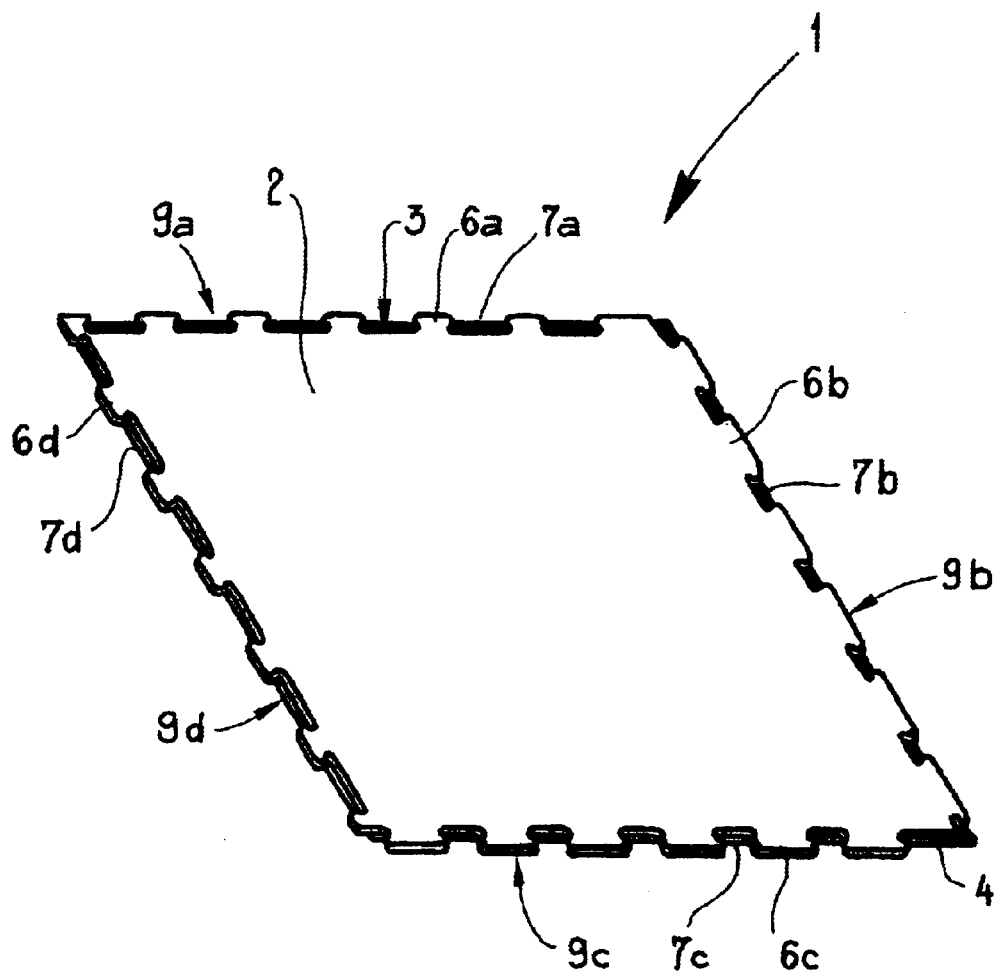
FIG. 1 illustrates an overall view of the tile according to the invention from below.

FIG. 1 illustrates the tile 1 from below, having an insulating support layer 2, an electrically conductive intermediate layer 3, and an electrically conductive wearing layer 4. The wearing layer 4, is made from a highly compressed thermoplastic. Of course, the wearing layer may also be made from other materials. The intermediate layer 3 which lies between the support layer 2 and the wearing layer 4 is fixedly joined to both. At its edge region 9a, 9b, 9c and 9d, the support layer 2 has integrally formed projections 6a, 6b, 6c and 6d and cutouts 7a, 7b, 7c and 7d. The projections 6a, 6b, 6c and 6d are intended to engage in a positively locking manner in the cutouts 7c, 7d, 7a and 7b of adjacent tiles.

In the present embodiment, the projections 6a and 6c are narrower than the projections 6b and 6d. However, any desired width of the projections and cutouts is possible. By way of example, variants in which the projections and cutouts have the same width or the projections alternately have different widths are preferred.

The intermediate layer 3 extends over two adjacent edge regions 9a and 9b of the support layer. The two further edge regions 9c and 9d of the support layer 2, which lie opposite the edge regions 9a and 9b and are likewise adjacent, are free of the intermediate layer.

The tile according to the invention is therefore configured in such a way that the projections 6a and 6b located in the edge regions 9a and 9b are intended to engage in the cutouts 7c and 7d of adjacent tiles, so that the intermediate layer extends continuously over the entire covering. The mechanical connection between two tiles is not at the same location as the electrical connection. Therefore, slight shifts in tiles within the area of the covering do not lead to an interruption in the electrical conductivity.

Figure 2A:
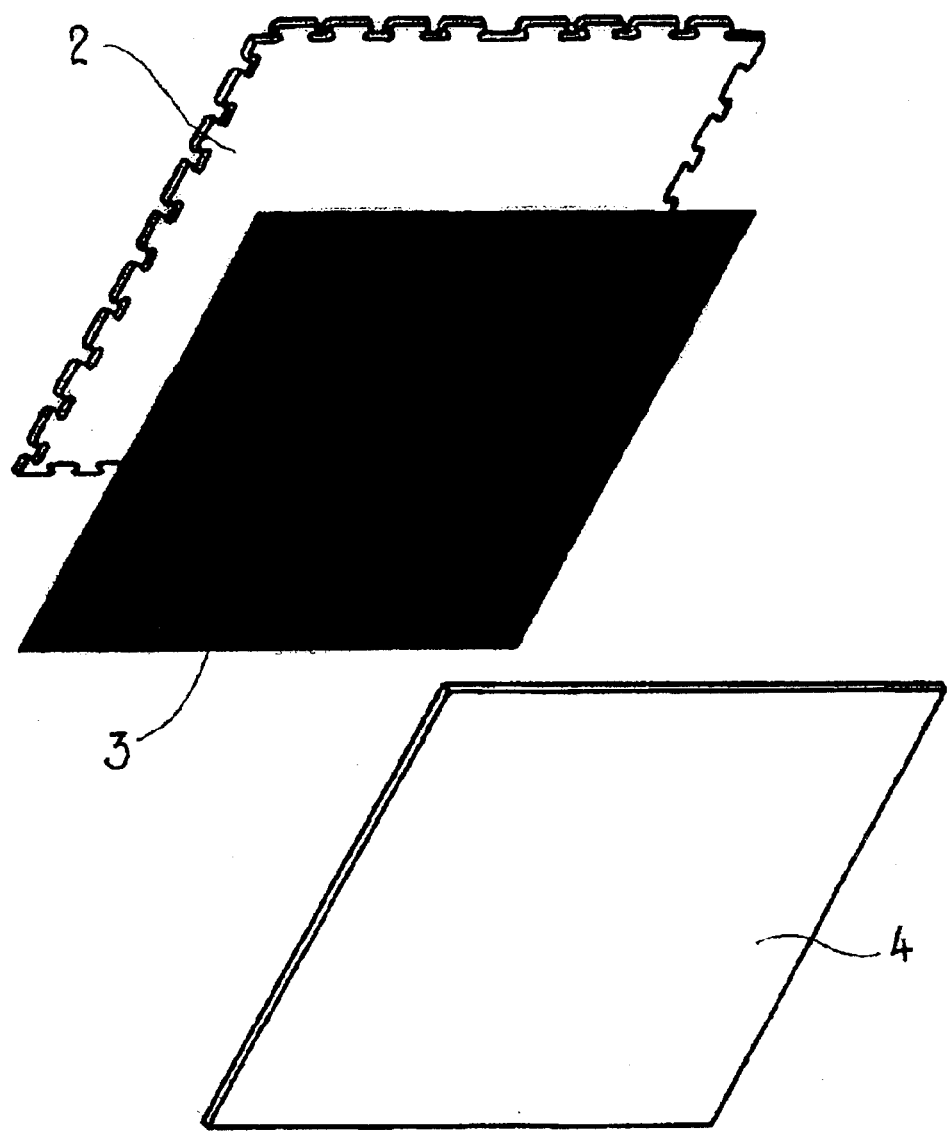
FIGS. 2a and 2b, each illustrate diagrammatically an exploded view of the support layer, intermediate layer and wearing layer of the tile.

FIG. 2a diagrammatically illustrates the support layer 2, the intermediate layer 3 and the wearing layer 4 which are intended to be fixedly joined to one another. In an embodiment illustrated here, the intermediate layer 3 and the wearing layer 4 are of the same size and are applied one above the other over the entire surface.

Figure 2B:
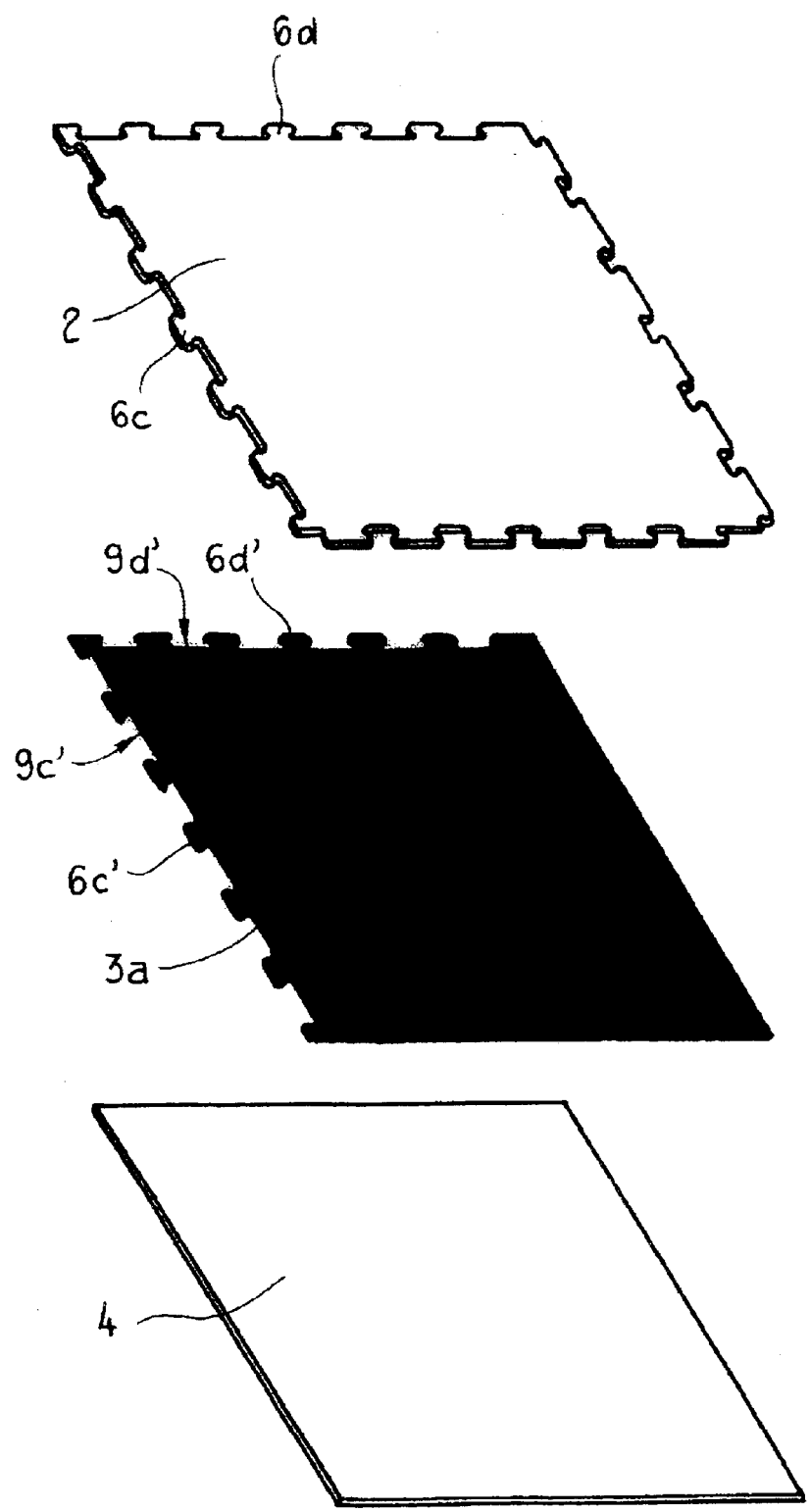

FIG. 2b diagrammatically illustrates the support layer 2, the intermediate layer 3 and the wearing layer 4 which are intended to be fixedly joined to one another. In an embodiment shown here, the intermediate layer 3a has, in the edge regions 9c' and 9d', projections 6c' and 6d' which are intended to cover the projections 6c and 6d of the support layer 2. The wearing layer 4, the intermediate layer 3a and the support layer 2 are of substantially the same size.

Figure 3:
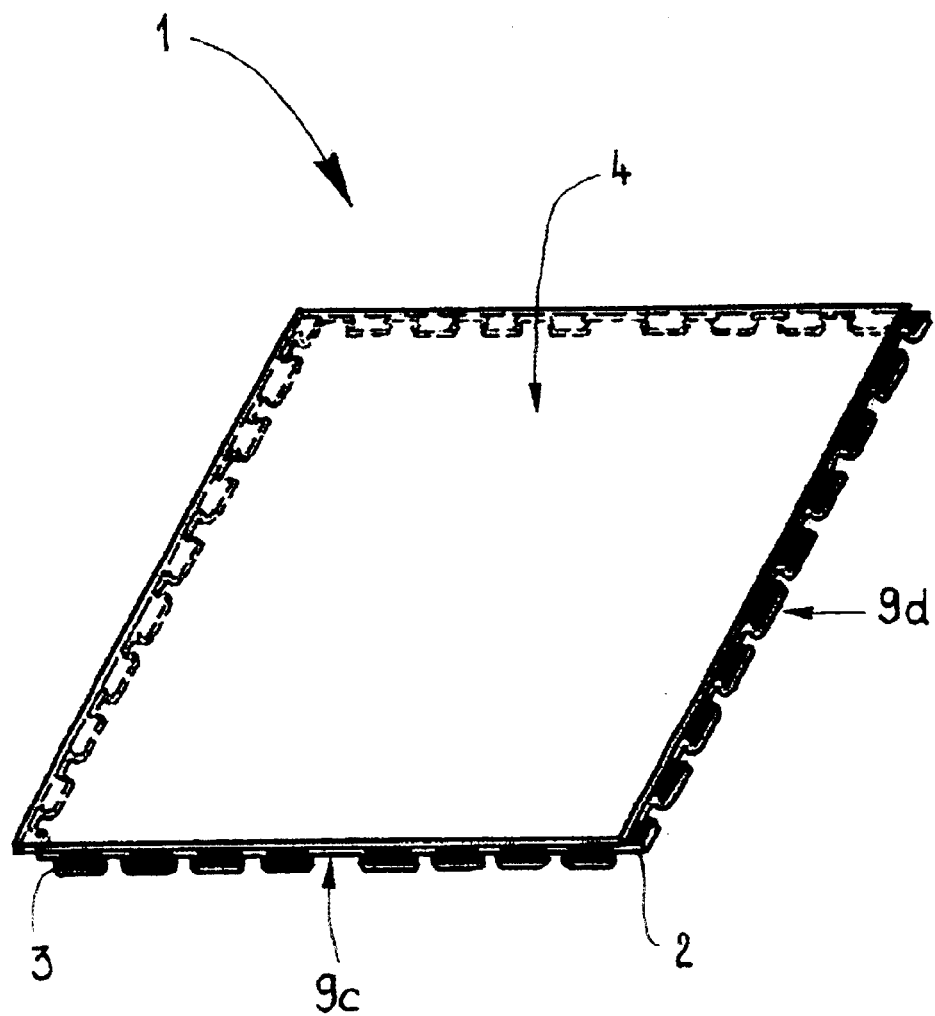
FIG. 3 illustrates an overall view of the tile according to the invention from above.

FIG. 3 illustrates the tile 1 from above, with an insulating support layer 2, an electrically conductive intermediate layer 3 and an electrically conductive wearing layer 4. The edge regions 9c and 9d are free of the intermediate layer.

Figure 4:
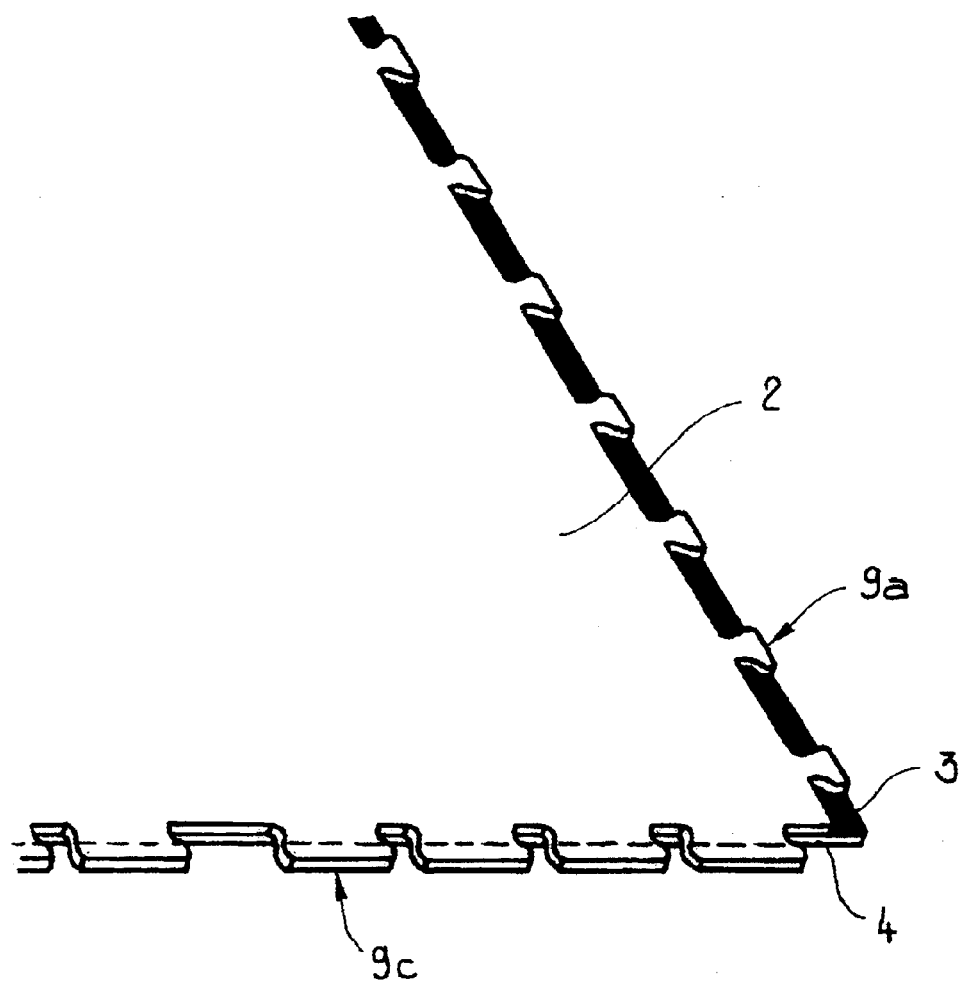
FIG. 4 illustrates part of the tile, including the cutouts and projections, from below.

FIG. 4 shows part of the tile according to the invention. The intermediate layer 3 which has been applied to the wearing layer 4 extends over the edge region 9a of the support layer 2, while the edge region 9c of the support layer 2 remains free of the intermediate layer.

The intermediate layer of the tiles according to the invention is an electrically conductive sheet-like structure. This may, for example, be a metal grid, a pattern of conductive fabric or copper strips, but may also be a conductive film or a conductive coating layer. Polystyrene films with added carbon black and soft polyvinyl chloride films with added carbon black are particularly preferred.

Polystyrene films can be made conductive by adding carbon black. These films preferably have a carbon black content of from 15 to 25%, preferably 18 to 22%. It is preferable to use polystyrene film or a PVC film with a thickness of 150 to 250 $\mu$m, preferably 200 to 250 $\mu$m. To produce these films, it is possible to use compounds in granule form, such as for example CABELEC 3896 produced by Cabot. Granules of this type have, inter alia, the following properties:

| | |
|---|---|
| Density | 1098 kg/l |
| Shore D hardness | 75 |
| VICAT softening point (10 N) | 118° C. |
| Melt flow index (200° C./10 kg) | 2.5 g/10 min |
| Volume resistivity | $10^2$ $\Omega$/cm |
| Flexural modulus | 1800 MPa |

The film produced therefrom, with a thickness of 200 $\mu$m, has a volume resistance determined in accordance with DIN 51953 of approx. $10^4$ $\Omega$.

The coating can be applied to the wearing layer over the entire surface or in defined patterns. This makes it possible to provide the intermediate layer with a defined volume resistance. A coating of this type may, for example, have the following compositions:

a) 18% of binder based on vinyl acetate/vinyl chloride,
  21% of graphite,
  1% of $NH_3$,
  60% of water
b) 27% of graphite,
  73% of water c) 25% of graphite,
  5% of swelling wheat starch,
  70% of water
d) 3% of carbon black,
  75% of vinyl acetate/vinyl chloride binder,
  16% of water,
  6% of film-forming and adhesion-promoting solvents
e) 36% of PU dispersion,
  4% of acrylic dispersion, 6% of glycols,
  1% of additives,
  4% of a conductive substance, such as for example carbon black,
  49% of water.

The graphite particles in the graphite suspensions have a grain size of between 1 μm and 100 μm, preferably from 1 μm to 30 μm. Suspensions incorporating graphite particles with a size of from 3 μm to 10 μm have proven particularly advantageous. For suspensions which contain carbon black, carbon black particles of large active surface area, preferably between 500 m²/g and 1500 m²/g, have proven advantageous. The coating has to be applied to the wearing layer in such a way that it forms a cohesive layer with a thickness of a few micrometers.

Figure 5:
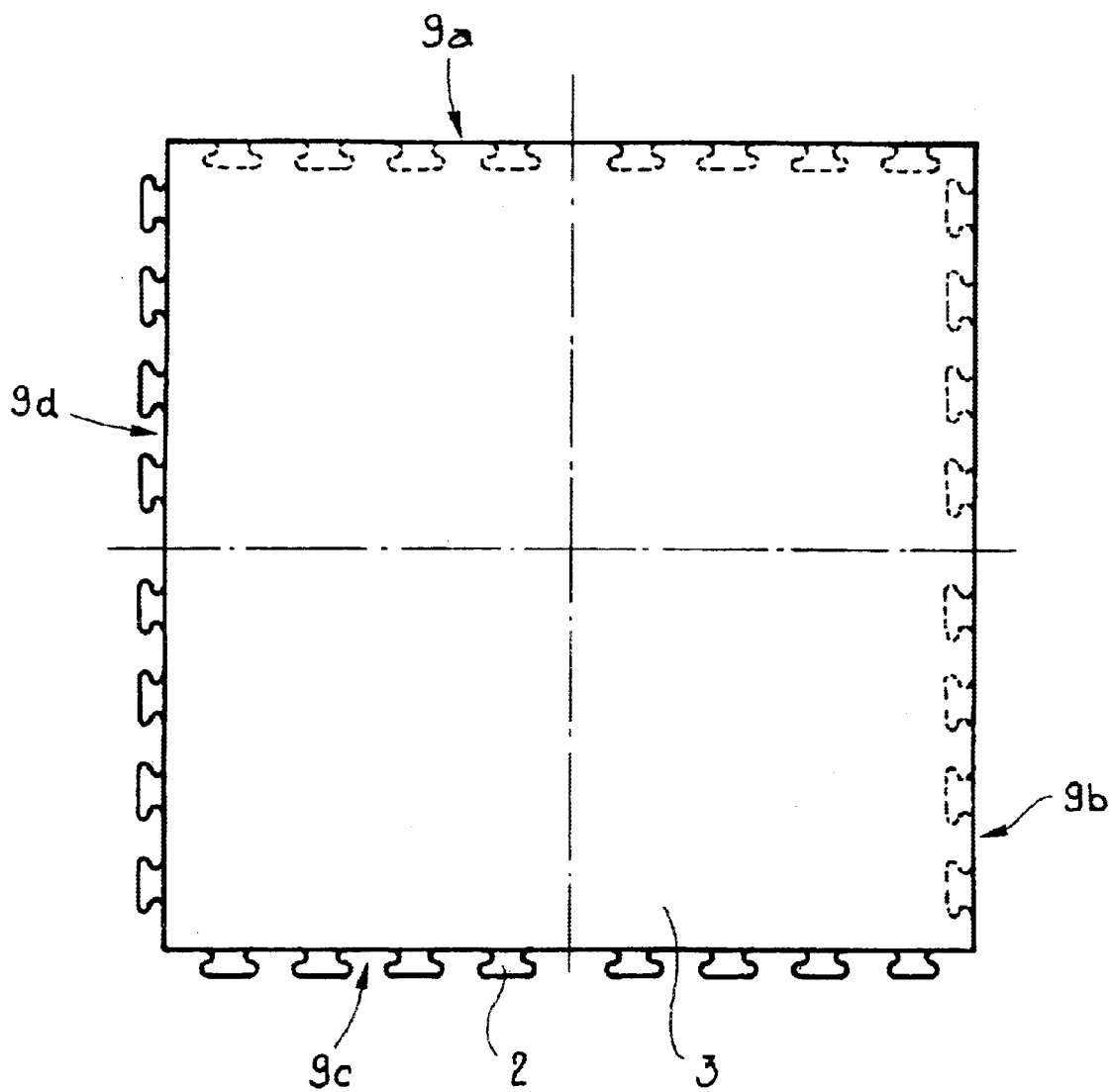
FIG. 5 diagrammatically illustrates the support layer and the intermediate layer.

FIG. 5 shows a diagrammatic view of the support layer 2 and the intermediate layer 3. The intermediate layer extends over the edge regions 9a and 9b of the support layer 2, while the edge regions 9c and 9d of the support layer 2 remain free of the intermediate layer.

In a further embodiment, the load-bearing capacity of the support layer is increased if the support layer has compression elasticity properties. By way of example, the support layer may be at least half made up of a polygonal structure, such as a honeycomb structure. The recesses in the edge regions of the polygonal structures improve the ventilation of the subfloor, which is preferable in particular in moist environments.

The support layer is preferably made from a reclaimed product, for example having the following composition:

| | |
|---|---|
| PVC (suspension quality) | 38–42% |
| Plasticizer (phthalic acid ester) | 12–14% |
| Inert substances (chalk, pigments) | 40–44% |
| Heat stabilizer | 2.5 to 3.5% |
| Processing auxiliary | 0 to 1%. |

This formulation results in Shore D hardnesses of 65 to 70. The support layer preferably has a thickness of 5 to 7 mm, particularly preferably of 6 mm.

A floor covering produced using the tiles according to the invention can also be subjected to load from, and driven on by, high weights.

The configuration of the tiles can be calculated using the finite element method.

A tile over which a fork-lift truck drives should, for example, satisfy the following demands:

| | |
|---|---|
| Weight | 10 t |
| Speed | 25 km/h |
| Braking distance | 15 m |
| Bearing surface area | 600 cm² |
| Modulus of elasticity | 500 MPa |
| resulting in a required force of 16,000 N. | |

With a coefficient of friction of 0.5 and a symmetrical distribution of forces, the force per bearing surface area is 2000 N.

| Number of connections per side | Modulus of elasticity (MPa) | Force (N) | Deformation (mm) | Stress (N/mm) | Tensile strength (MPa) |
|---|---|---|---|---|---|
| 4 | 500 | 2000 | 3.7 | 37 | 18 |
| 8 | 500 | 2000 | 2.2 | 20 | 18 |
| 16 | 500 | 2000 | 1.4 | 15.3 | 18 |

If the floor covering is to be able to withstand a load of this level, 16 connections should be used on each side, meaning a combination of 8 projections and 8 cutouts on each side of the support layer of the tile according to the invention. If there is a smaller number of connections, the maximum load-bearing capacity is reduced accordingly.

Figure 6A:
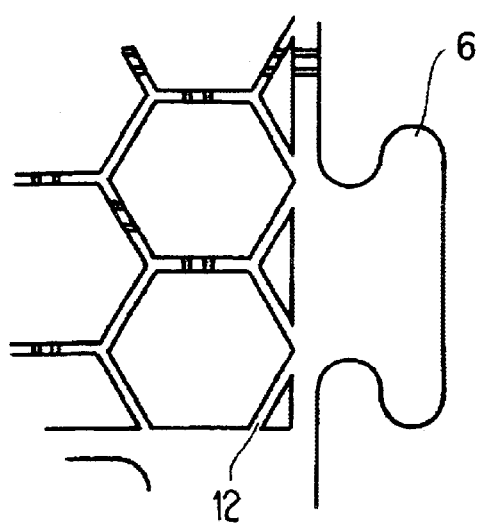
FIGS. 6a and 6b diagrammatically illustrates the support layer from above and from the side, respectively.

FIG. 6a shows part of a support layer 2a. The support layer 2a is hexagonal in shape, i.e. has a honeycomb structure. The hexagon is delimited by narrow joints 12. The projections directly adjoin the hexagon structure. The honeycomb structure increases the load-bearing capacity of the support layer, making it particularly suitable for use for industrial floors.

Figure 6B:
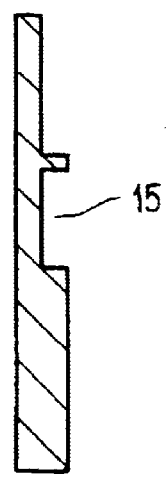

FIG. 6b shows the side view of a support layer 2a which is shown below 6a, from the side. The support layer may have recesses 15. These recesses improve the ventilation of the subfloor. The recesses 15 may be distributed regularly or irregularly over the entire support layer.

Figure 7:
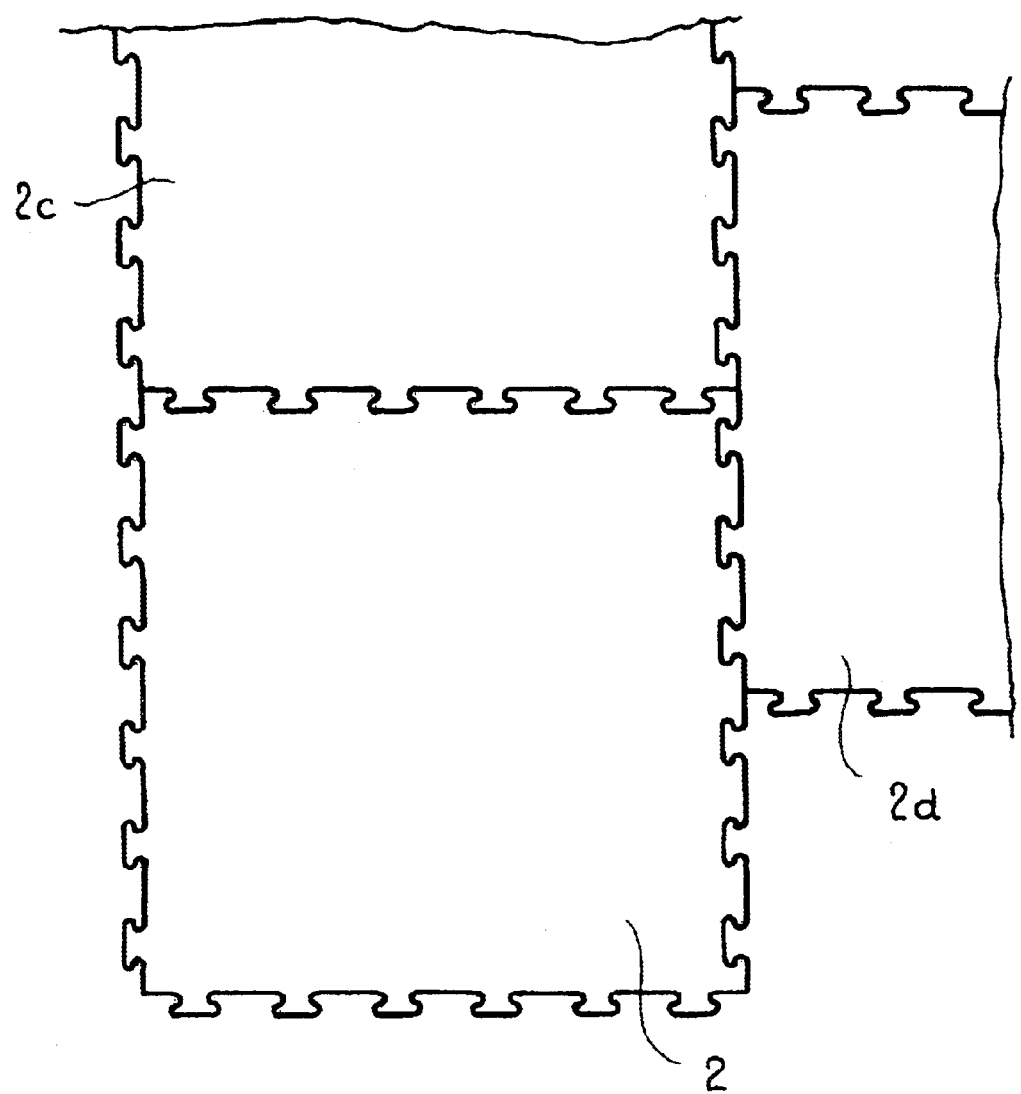
FIG. 7 diagrammatically illustrates the support layer from above.

FIG. 7 shows a support layer 2 from above. The adjacent support layer 2c is arranged aligned with the support layer 2, while the support layer 2d is connected to half the support layer 2. This style of laying makes it possible to improve the load distribution.

Figure 8:
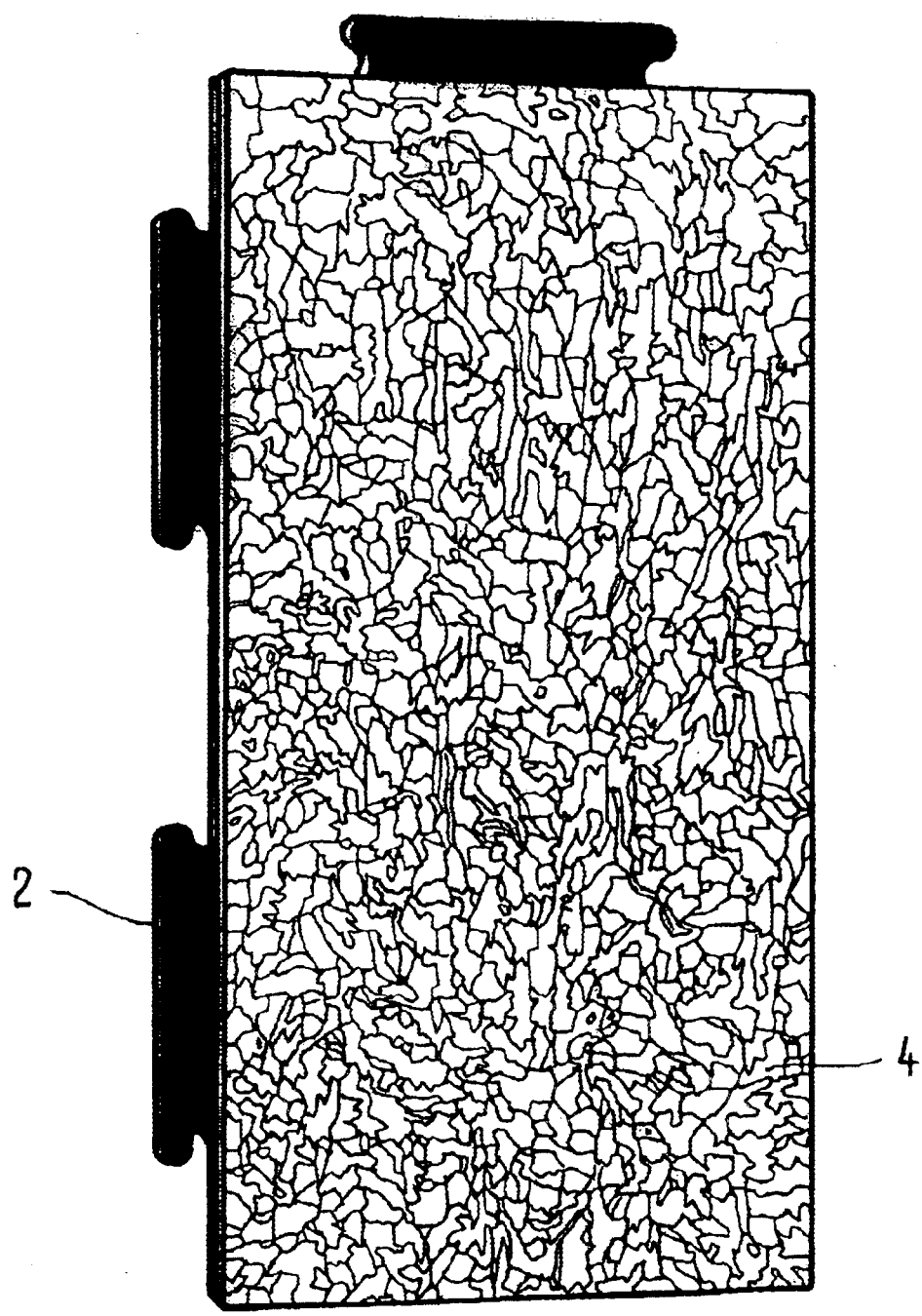
FIGS. 8 and 9, each illustrate an overall view of a preferred embodiment.

FIG. 8 shows an embodiment of the tiles according to the invention from above. In this embodiment, the electrically conductive wearing layer 4, in addition to the defined electrical and mechanical properties, also has a pattern which is caused by carbon black or graphite inclusions and which at the same time serves as a decorative layer.

Figure 9:
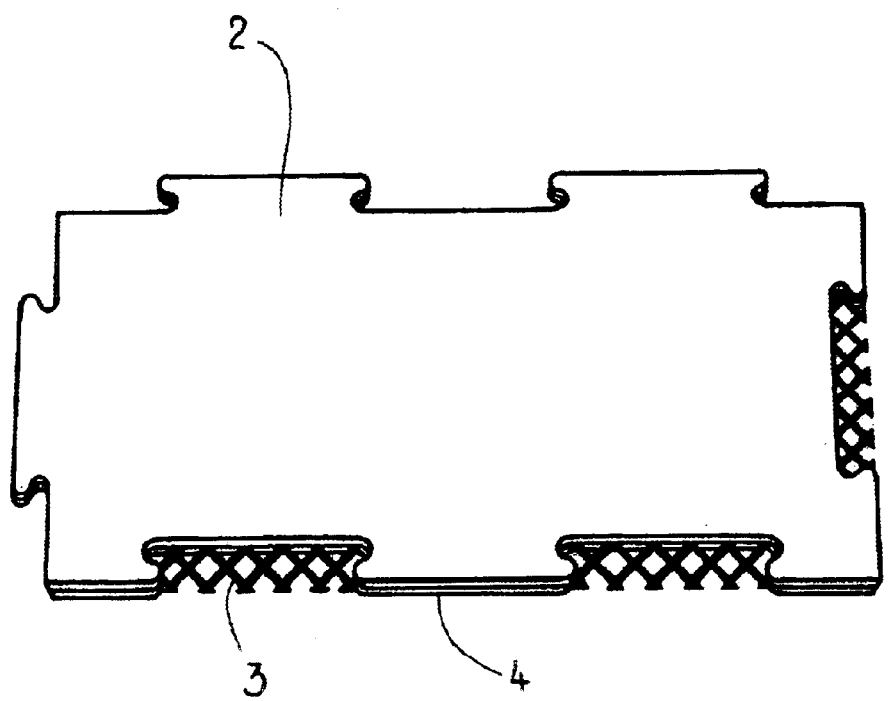

FIG. 9 shows the embodiment shown in FIG. 7 from below. An additional grid-like printed pattern of a conductive substance, which has been applied to the wearing layer 3, is able to further increase the electrical conductivity of the tile according to the invention.

What is claimed is:
1. A tile, comprising:
  a support layer and a wearing layer, wherein the wearing layer and the support layer are polygonal in shape and have edge regions, the edge regions of the support layer having projections and cutouts, the projections engage in a positively locking manner in the cutouts in the support layer of adjacent tiles; and
  a conductive intermediate layer arranged between the support layer and the wearing layer, the intermediate layer being fixedly joined to both, wherein the intermediate layer extends over at least two adjacent edge regions of the support layer, and the projections of at least two edge regions of the support layer are free of the intermediate layer.
2. The tile as claimed in claim 1, wherein the wearing layer is conductive.
3. The tile as claimed in claim 1, wherein the wearing layer and the intermediate layer lie one above the other over the entire surface area.
4. The tile as claimed in claim 1, further comprising;
  a conductive intermediate layer arranged between the support layer and the wearing layer, the intermediate layer being fixedly joined to both, wherein the intermediate layer extends over at least two adjacent edge regions of the support layer, and the intermediate layer extends over the projections of the support layer of two further adjacent edge regions.

5. The tile as claimed in claim 1, wherein the intermediate layer is a conductive sheet-like structure.

6. The tile as claimed in claim 5, wherein the conductive sheet-like structure is a film or a coating layer.

7. The tile as claimed in claim 6, in which the film is a polystyrene film with added carbon black or a soft polyvinyl chloride film with added carbon black.

8. The tile as claimed in claim 1, wherein the projections have a dovetail-like shape.

9. The tile as claimed in claim 1, wherein the support layer is electrically insulating.

10. The tile as claimed in claim 1, wherein the support layer is produced by means of injection molding.

11. The tile as claimed in claim 1, wherein the wearing layer is a decorative layer.

12. A covering surface produced using tiles as claimed in claim 1, in which only the wearing layer is visible from above.

13. A process for producing tiles as claimed in claim 1, comprising:
  laying down the wearing layer
  applying the intermediate layer to the wearing layer, and
  applying the support layer to the intermediate layer by means of injection molding, resulting in a three-layer structure.

* * * * *